Oct. 31, 1939.                    H. C. DREIBUSS                    2,177,693
                                        WHEEL
                              Filed Jan. 25, 1936        2 Sheets-Sheet 1
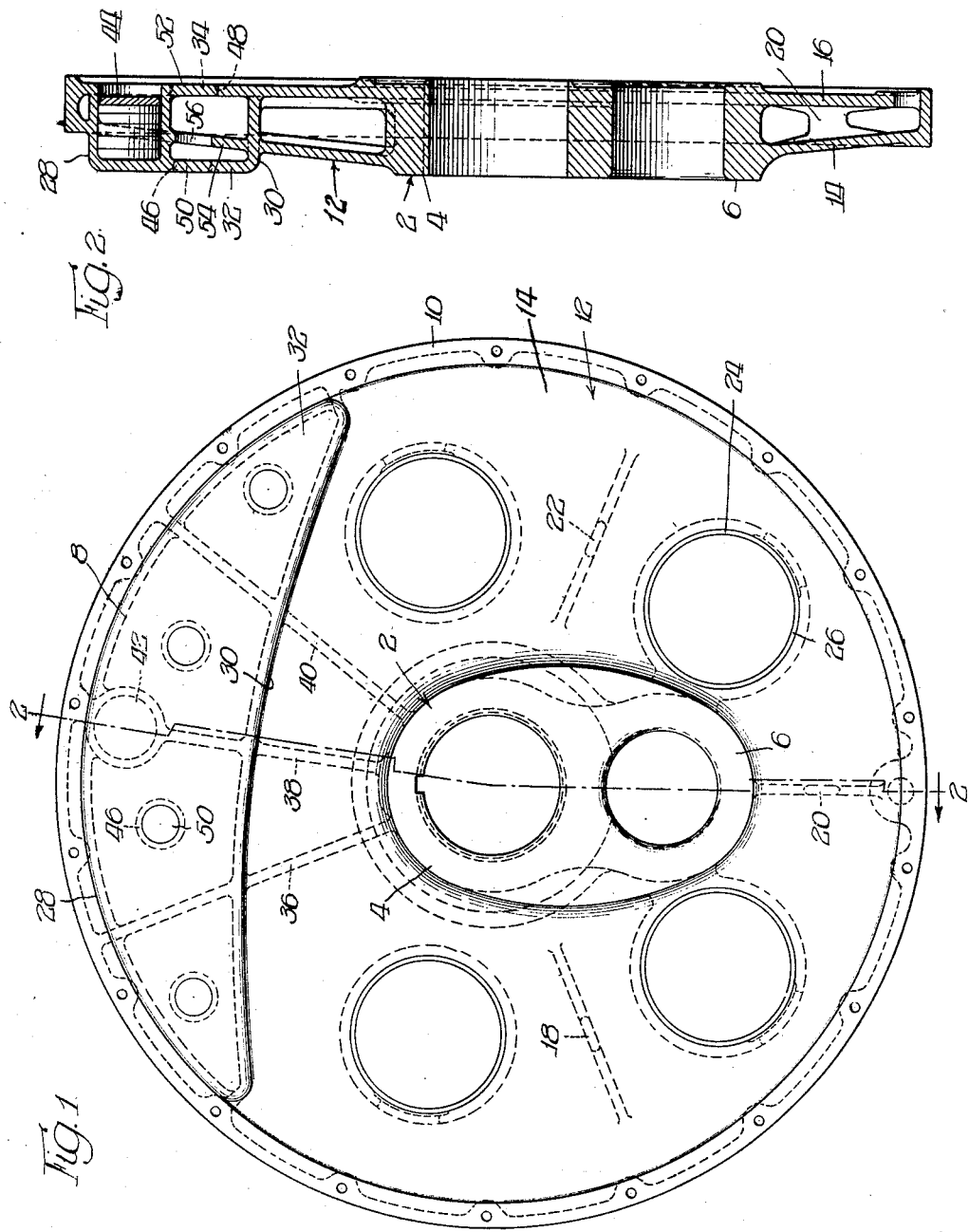

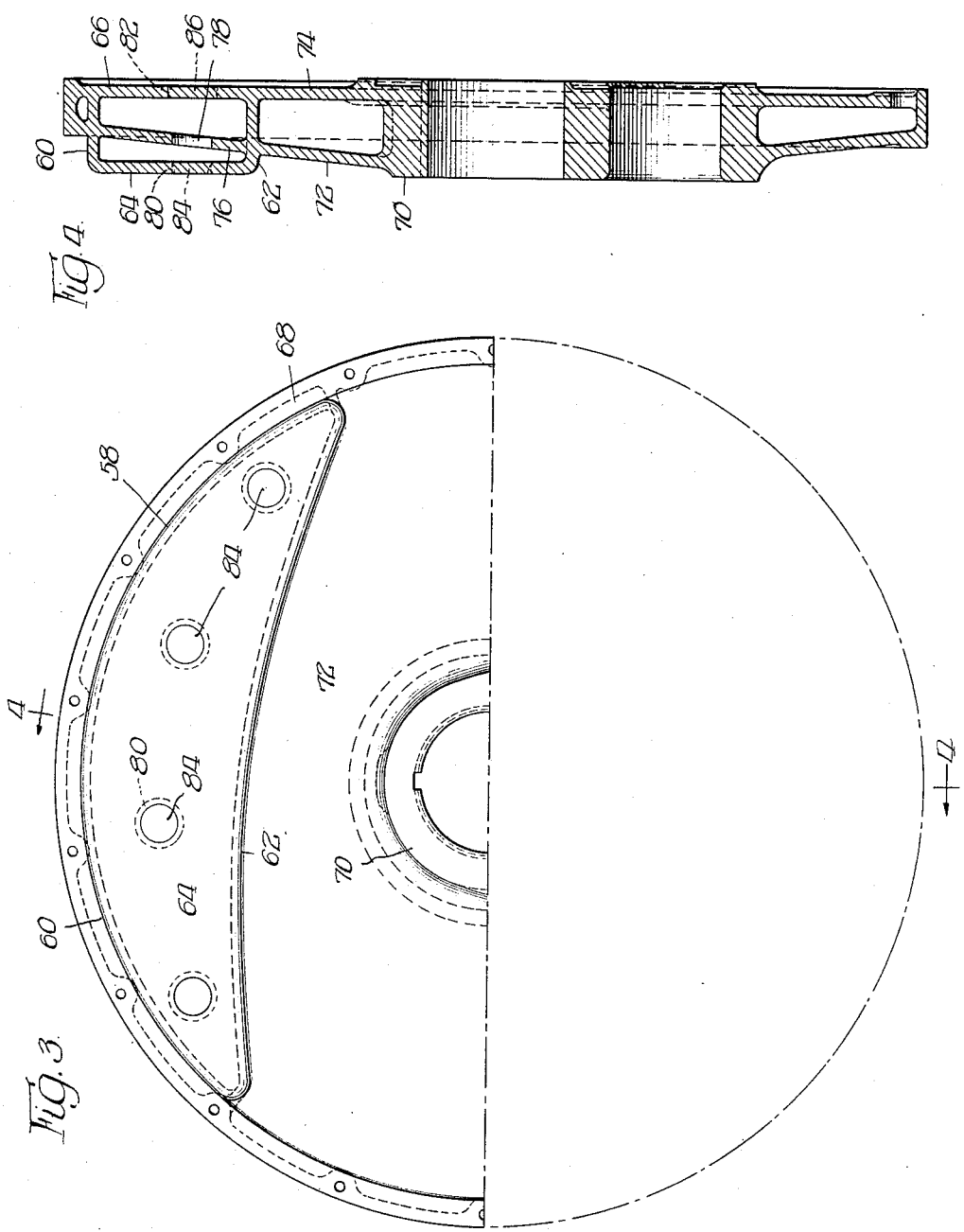

Patented Oct. 31, 1939

2,177,693

UNITED STATES PATENT OFFICE 2,177,693

WHEEL

Harry C. Dreibuss, St. Louis, Mo., assignor to Harry Scullin, St. Louis, Mo., a corporation of Missouri Application January 25, 1936, Serial No. 60,837

24 Claims. (Cl. 295—6)

The present invention relates to wheels and more in particular to wheels or wheel centers for locomotives or the like.

As is well known in the art, locomotive wheels or wheel centers or the like, when of relatively small diameter, may be provided with hollow counterbalance pockets without experiencing difficulties in the proper designing of the same which would cause failure either in the pocket construction or load carrying means extending between the pocket and the hub thereof. However, when the diameter of these wheels is increased, as for example to 72 inches, it has been found that the load carrying means adjacent the counterbalancing pocket is subject to excessive stresses, thereby causing partial or complete failure thereof unless some provision is made for properly reinforcing the same. Various attempts have been made to provide such reinforcement, as for example by increasing the thickness of one or more members of the load carrying means adjacent the counterbalance pocket and/or similarly increasing the thickness of various portions of the counterbalance pocket. This attempt to correct the deficiencies existing in the design of a wheel of this size introduces complications in the casting of the wheel which, instead of correcting the faults in such a design, have no appreciable effect whatever and often lead to a weakening of the wheel structure at the points where reinforcement is desired. The increasing of these sections results in uneven cooling of the wheel elements during casting, thus introducing internal stresses and strains in the metal sections and often resulting in flaws, cracks and other imperfections which result in a weakened wheel structure.

The present invention therefore comprehends a novel structure in a counterbalanced wheel or wheel center wherein the counterbalance pocket is properly reinforced, such reinforcement serving to prevent excessive flexing of the load carrying means adjacent thereto and also serving to uniformly distribute the unsupported load between the rim and load carrying means at the counterbalance pocket.

Another object of the present invention is to provide reinforcing means in the pocket of a counterbalanced wheel or wheel center, which reinforcing means is substantially in the plane of the wheel and is disposed between the inner and outer walls of the counterbalance pocket.

Another object of the present invention is to provide novel reinforcing means in the pocket of a counterbalanced wheel or wheel center which is so disposed as to prevent excessive flexing of the load carrying means adjacent the counterbalance pocket and to uniformly distribute load thereto at its point of intersection with the counterbalance pocket.

Still another object of the present invention is to provide reinforcing means in the pocket of a counterbalanced wheel or wheel center which is in substantial alignment with and forms a continuation of one or more elements of load carrying means disposed between the pocket and the hub of the wheel.

More particularly, the invention includes the idea of providing a reinforcing web in the pocket of a counterbalanced wheel or wheel center, which web extends between the rim forming part of the counterbalance and the oppositely disposed wall and is in substantial alignment with a web or webs of a load carrying means adjacent said oppositely disposed wall.

Other objects, features, capabilities and advantages are comprehended by the invention, as will later appear and as are inherently possessed thereby.

Referring to the drawings:

Figure 1 is a view in elevation of a counterbalanced wheel center made in accordance with the present invention;

Figure 2 is a view in cross section taken in the plane represented by line 2—2 of Figure 1 of the drawings;

Figure 3 is a fragmentary view in elevation of a modified form of counterbalanced wheel center incorporating structure made in accordance with the present invention; and Figure 4 is a view in cross section taken in the plane represented by line 4—4 of Figure 3 of the drawings.

Referring now more in detail to the drawings, an embodiment selected to illustrate the present invention is shown in Figures 1 and 2 as comprising a hub 2 having a main hub portion 4, a crank pin hub portion 6, a counterbalance pocket 8, a rim 10, and load carrying means 12 extending between the hub 2 and rim 10 and between this hub and the counterbalance pocket 8.

In the present embodiment, the load carrying means 12 of the wheel center comprises spaced webs 14 and 16 which may be reinforced by the transverse webs 18, 20 and 22 and may be provided with a plurality of openings such as 24, certain of which are provided for removing core forming material from between the webs and certain of which are provided for backing through pins associated with driving means for the wheel. As shown in the drawings, these openings may be closed by transverse sleeves 26 extending between the opposite webs and secured thereto adjacent the periphery of the openings by means of welding or the like.

The counterbalance 8 of the wheel center is disposed adjacent the rim 10 and is formed with the oppositely disposed walls 28, 30, 32 and 34, the wall 28 being formed in part by the rim portion of the wheel adjacent the counterbalance pocket, and the wall 34 forming a substantial continuation of the wall 16 of the wheel. The walls 28 and 30 extend beyond the rim 10 and the point of intersection of the web 14 with the counterbalance pocket, respectively, the overhanging part thereof being connected by the wall 32.

The wheel at the counterbalance pocket and between the same and the main hub portion 4 is reinforced by webs 36, 38 and 40 which extend radially outwardly from the main hub portion 4 toward the rim 10, the same intersecting the wall 30 of the counterbalance pocket. The webs 36 and 40 within the counterbalance pocket extend to and terminate in the rim of the wheel, while the web 38 within the counterbalance pocket is provided with a recess 42 which serves to hold counterbalancing material which may be added as seen fit to properly counterbalance the wheel, this recess being closed by the closure plate 44 which may be welded or otherwise secured in this recess. The walls 32 and 34 of the counterbalance pocket are provided with substantially oppositely disposed openings such as 46 and 48, which are provided for the removal of core forming material between the pocket and for the introduction of counterbalancing material, such as lead or other relatively heavy material, these openings being closed by closure plates 50 and 52 which may be welded or otherwise secured to the walls.

As heretofore indicated, in a wheel of the diameter disclosed in Figures 1 and 2 of the drawings, some difficulty has been experienced in keeping the stresses in the web 14 between the main hub portion 4 and the counterbalance pocket 8 within a limit which would provide an ample factor of safety and prevent excessive flexing thereof.

The present invention overcomes these difficulties by introducing into the counterbalance pocket 8 a web 54 which extends throughout the length of the counterbalance pocket and between the wall 30 and the outer edge of the rim 10 at the counterbalance pocket. In the embodiment disclosed, this reinforcing plate 54 is substantially a continuation of web 14 between the hub portion 4 and the counterbalance pocket and extends to intersect the rim 10 and the counterbalance pocket at the same point as web 14 intersects the remaining portion of the rim, the reinforcing web 54 being provided with one or more openings 56 which may be disposed in substantial alignment with openings 46 and 48 to facilitate removal of core forming material from and the introduction of counterbalancing material into the counterbalance pocket.

In Figures 3 and 4 of the drawings the wheel is provided with a counterbalance pocket 58 which corresponds substantially to the counterbalance pocket 8 of Figures 1 and 2 of the drawings. This counterbalance pocket is provided with oppositely disposed walls 60, 62, 64 and 66, the wall 60 being formed in part by the rim 68 of the wheel.

In the wheel construction of Figures 3 and 4, the wheel is further provided with a hub 70 and oppositely disposed webs 72 and 74 forming the load carrying means between the hub and rim, as well as between the hub and the counterbalance pocket 58. In this embodiment, the counterbalance pocket is reinforced by the single wall 76 corresponding to the wall 54 which extends from the wall 62 substantially at the point of intersection of web 72 therewith to the rim 68 and is provided as a substantial continuation of the web 72. This web is provided with one or more openings 78 in substantial alignment with one or more openings 80 and 82 provided in the walls 64 and 66, respectively, of the counterbalance pocket whereby core forming material may be removed from the counterbalancing material introduced into the pocket, the openings 80 and 82 being closed by members 84 and 86 which may be welded or otherwise secured to the walls 64 and 66.

As is well known, various railroads throughout the country have more or less discarded wheels and wheel centers for locomotives which are provided with solid spokes and have turned to the type of wheel shown in the present drawings, which has become known in the trade as "the double disc wheel." Spoke type wheels, however, are being manufactured for the various railroads. However, these wheels are not formed with solid spokes but on the other hand may include spokes of box or channel section, or other sections of hollow or open construction. All of these wheels have the decided advantage of giving the wheel the required structural strength with a radical decrease in the required amount of metal over the former spoke wheels. The difficulties above enumerated, however, are present in all of these wheel constructions, and the load carrying means, whether the same be in the form of spokes or webs, is nevertheless subjected to excessive flexing adjacent the counterbalance pocket and between the same and the hub. The present invention corrects the structural deficiencies in these various types of wheels, and it is therefore to be understood that the present invention is not to be limited to any particular type of wheel, but on the other hand is of sufficient scope as to be adapted for use in any of these wheels referred to which are provided with a counterbalance pocket.

While I have herein described and upon the drawings shown an illustrative embodiment of the invention, it is to be understood that the invention is not limited thereto but may comprehend other constructions, arrangements of parts, details and features without deparing from the spirit of the invention.

I claim:

1. A wheel for a locomotive or the like, comprising a member provided with a counterbalance pocket having inner and outer radially spaced walls, and means within said pocket disposed and extending substantially radially and transversely in respect to the axis of said member, said means extending outwardly from at least the central portion of the inner of said walls for reinforcing said pocket.

2. A wheel for a locomoive or the like, comprising a member provided with a counterbalance pocket, said pocket having an outer peripheral wall, and an oppositely disposed wall having parts spaced from said first-named wall, and reinforcing means extending between said walls and substantially in the plane of one face of said wheel.

3. A wheel for a locomotive or the like, comprising a member provided with a counterbalance pocket, said pocket having an outer peripheral wall, and an inner wall oppositely disposed in respect to said first-named wall, said pocket further including axially spaced walls, and a reinforcing web between said axially spaced walls and extending between said inner and outer walls and disposed substantially in a plane transversely disposed in respect to the axis of said wheel.

4. A wheel for a locomotive or the like, comprising a member provided with a counterbalance pocket, and a reinforcing web within said pocket disposed substantially in the plane of one face of said wheel.

5. A wheel for a locomotive or the like, comprising a member provided with a rim portion, a hub, a counterbalance pocket, load carrying means extending outwardly from said hub and comprising a web intersecting said pocket, said counterbalance being formed in part by said rim portion and a wall disposed inwardly with respect thereto and in part by axially spaced walls, and reinforcing means between said axially spaced walls and disposed substantially in a plane transversely disposed in respect to the axis of said wheel and forming a substantial continuation of said web.

6. A wheel for a locomotive or the like, comprising a member provided with a rim portion, a counterbalance pocket, said counterbalance being formed in part by said rim portion and a wall disposed inwardly with respect thereto and in part by axially spaced walls, and at least one reinforcing web between said axially spaced walls and disposed substantially in a plane of one face of said wheel adjacent the counterbalance pocket and extending between said first named wall and said rim portion.

7. A wheel for a locomotive or the like, comprising a member provided with a rim portion, a counterbalance pocket, said counterbalance pocket having radially and axially oppositely disposed walls, said rim portion forming a part of one of said walls, and reinforcing means between said axially disposed walls and disposed substantially in a plane of one face of said wheel adjacent the counterbalance pocket and extending outwardly from the inner of said radially disposed walls.

8. A wheel for a locomotive or the like, comprising a member provided with a rim portion, a counterbalance pocket, said counterbalance pocket having radially and axially oppositely disposed walls, said rim portion forming a part of one of said walls, and a reinforcing web between said axially disposed walls and disposed substantially in a plane of one face of said wheel adjacent the counterbalance pocket, said web being substantially coextensive with and extending outwardly from the inner of said radially disposed walls.

9. A wheel for a locomotive or the like, comprising a member provided with a hub, a rim, a counterbalance pocket having radially and axially disposed walls, load carrying means for transferring load between said hub and rim, and reinforcing means within said counterbalance pocket and extending transversely with respect to the axis of said wheel from the inner of said radially disposed walls at least at the central portion thereof for preventing excessive flexing of said load carrying means adjacent said counterbalance pocket.

10. A wheel for a locomotive or the like, comprising a member provided with a hub, a rim, a counterbalance pocket having radially and axially disposed walls, load carrying means for transferring load between said hub and rim, and at least one reinforcing web within said counterbalance pocket and extending transversely with respect to the axis of said wheel from the inner of said radially disposed walls at least at the central portion thereof for preventing excessive flexing of said load carrying means adjacent said counterbalance pocket.

11. A wheel for a locomotive or the like, comprising a member provided with a hub, a rim, a counterbalance pocket having radially and axially disposed walls, one of said walls comprising a portion of said rim, load carrying means for transferring load between said hub and rim, and reinforcing means within said counterbalance pocket and extending transversely with respect to the axis of said wheel between said radially disposed walls at least at the central portion thereof for transferring load uniformly between said load carrying means and said rim adjacent said counterbalance pocket and to prevent excessive flexing of said load carrying means adjacent said counterbalance pocket.

12. A wheel for a locomotive or the like, comprising a member provided with a hub, a rim, a counterbalance pocket having radially and axially disposed walls, one of said walls comprising a portion of said rim, load carrying means for transferring load between said hub and rim, and reinforcing means within said counterbalance pocket and extending transversely with respect to the axis of said wheel between and coextensive with said radially disposed walls providing a continuous support for said rim at said counterbalance for the more uniform transfer of load between said rim and load carrying means and to prevent failure of said rim and load carrying means adjacent the counterbalance pocket.

13. A wheel for a locomotive or the like, comprising a member provided with a hub, a rim, a counterbalance pocket, load carrying means for transferring load between said hub and rim, said load carrying means including a web intersecting said counterbalance pocket, and reinforcing means within said pocket adjacent to and substantially coextensive with said web and preventing excessive flexing of said web.

14. A wheel for a locomotive or the like, comprising a member provided with a hub, a rim, a counterbalance pocket, load carrying means for transferring load between said hub and rim, said load carrying means including a web intersecting said counterbalance pocket, and reinforcing means disposed within said pocket, said reinforcing means terminating in said pocket adjacent the intersection of said web therewith and including a web adjacent to and substantially coextensive with said first-named web.

15. A wheel for a locomotive or the like, comprising a member provided with a hub, a rim, a counterbalance pocket, load carrying means for transferring load between said hub and rim, said load carrying means including a web intersecting said counterbalance pocket, and a reinforcing web disposed within said pocket and comprising a substantial continuation of said first-named web, said reinforcing web terminating in said pocket adjacent said rim and said first-named web.

16. A wheel for a locomotive or the like, comprising a member provided with a hub, a rim, a counterbalance pocket, load carrying means for transferring load between said hub and rim, said load carrying means including spaced webs, and a reinforcing web disposed within said counterbalance pocket, said last-named web extending radially outward from the inner of said first-named webs.

17. A wheel for a locomotive or the like, comprising a member provided with a hub, a rim, a counterbalance pocket, load carrying means for transferring load between said hub and rim, said counterbalance pocket having oppositely disposed walls and being formed in part by said rim, said load carrying means including spaced webs, and a reinforcing web disposed within said counterbalance pocket, said last-named web extending from substantially the point of intersection of one of said first-named webs with said counterbalance pocket to the wall forming part of said rim.

18. A wheel for a locomotive or the like, comprising a member provided with a hub, a rim, a counterbalance pocket, load carrying means for transferring load between said hub and rim, said counterbalance pocket having oppositely disposed walls and being formed in part by said rim, said load carrying means including spaced webs, a reinforcing web disposed within said counterbalance pocket, said last-named web extending from substantially the point of intersection of one of said first-named webs with said counterbalance pocket to the wall forming part of said rim, certain of the walls of said counterbalance pocket and said reinforcing web having oppositely disposed openings, and closure means for the openings of said walls.

19. A wheel for a locomotive or the like, comprising a member formed with a hub and rim portion and provided with a counterbalance pocket having radially and axially spaced oppositely disposed walls, load carrying means extending outwardly from said hub and including a web intersecting a wall of said counterbalance pocket, and a plurality of intersecting reinforcing webs extending between said oppositely disposed walls, certain of said last-named webs comprising a substantial continuation of said first-named web.

20. A wheel for a locomotive or the like, comprising a member provided with a hub, a rim, a counterbalance pocket, load carrying means for transferring load between said hub and rim, said counterbalance pocket having oppositely disposed walls, said load carrying means including spaced webs, reinforcing webs between said spaced webs adjacent said pocket, a plurality of intersecting reinforcing webs extending between said oppositely disposed walls of said counterbalance, said last-named webs being substantially continuations of said first-named reinforcing webs and one of the spaced webs of said load carrying means.

21. A wheel comprising a member provided with a hub, a rim, load carrying means extending between said hub and rim and including spaced webs disposed at least adjacent a portion of said rim, and a counterbalance, said counterbalance being formed in part between said webs and in part by a pocket disposed exteriorly of one of said webs.

22. A wheel comprising a member provided with a hub, a rim, load carrying means extending between said hub and rim and including spaced webs disposed at least adjacent a portion of said rim, and a counterbalance, said counterbalance being formed in part between said webs and rim and a longitudinally disposed web having its ends terminating at said rim and having portions thereof spaced radially from said rim and in part by a pocket disposed exteriorly of one of said first-named webs.

23. A wheel comprising a member provided with a counterbalance pocket having radially and axially spaced oppositely disposed walls, and intersecting reinforcing means disposed between said walls, said means being disposed axially and transversely with respect to the axis of said wheel, said transversely disposed reinforcing means being substantially coextensive with and extending from the inner of said radially disposed walls.

24. A wheel comprising a member provided with a hub, a rim, a counterbalance pocket, load carrying means for transfer of load between said hub and rim, said counterbalance pocket having radially and axially spaced oppositely disposed walls, one of said walls being formed in part by said rim, and intersecting reinforcing means extending between said oppositely disposed walls of said counterbalance pocket, said transversely disposed reinforcing means being substantially coextensive with and extending from the inner of said radially disposed walls and being substantially in the plane of one of the faces of said wheel adjacent the counterbalance pocket.

HARRY C. DREIBUSS.

CERTIFICATE OF CORRECTION.

Patent No. 2,177,693. October 31, 1939.

HARRY C. DREIBUSS.

It is hereby certified that the above numbered patent was erroneously issued to "Harry Scullin, of St. Louis, Missouri, a corporation of Missouri" as assignee, whereas said patent should have been issued to Scullin Steel Co., of St. Louis, Missouri, a corporation of Missouri, as assignee by mesne assignments, as shown by the record of assignments in this office; page 2, second column, line 16, for "the" read and; and line 68, claim 2, for "locomoive" read locomotive; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.